United States Patent
Liu

(10) Patent No.: US 10,972,883 B2
(45) Date of Patent: Apr. 6, 2021

(54) TERMINAL AND DATA TRANSMISSION TO PERFORM TERMINAL TO TERMINAL DATA TRANSMISSION IN AN INTERNET OF VEHICLES (IOV) SYSTEM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 175 days.

(21) Appl. No.: 16/340,304

(22) PCT Filed: Jan. 18, 2018

(86) PCT No.: PCT/CN2018/073246
§ 371 (c)(1),
(2) Date: Apr. 8, 2019

(87) PCT Pub. No.: WO2019/140602
PCT Pub. Date: Jul. 25, 2019

(65) Prior Publication Data
US 2021/0037360 A1    Feb. 4, 2021

(51) Int. Cl.
*H04W 4/44* (2018.01)
*H04W 72/04* (2009.01)
*H04W 72/12* (2009.01)

(52) U.S. Cl.
CPC ......... *H04W 4/44* (2018.02); *H04W 72/0453* (2013.01); *H04W 72/1242* (2013.01); *H04W 72/1257* (2013.01); *H04W 72/1263* (2013.01)

(58) Field of Classification Search
CPC . H04W 28/0278; H04W 28/06; H04W 28/08; H04W 4/08; H04W 72/04; H04W 76/11; H04W 76/14
See application file for complete search history.

(56) References Cited

U.S. PATENT DOCUMENTS

| | | | |
|---|---|---|---|
| 2017/0006649 A1* | 1/2017 | Zhao | H04W 28/0278 |
| 2017/0019812 A1* | 1/2017 | Lee | H04W 28/0278 |

(Continued)

FOREIGN PATENT DOCUMENTS

| | | |
|---|---|---|
| CN | 103501506 A | 1/2014 |
| CN | 104768206 A | 7/2015 |

(Continued)

OTHER PUBLICATIONS

The First Chinese Office Action dated Feb. 6, 2020; Appln. No. 201880003240.3.

(Continued)

*Primary Examiner* — Mewale A Ambaye

(57) ABSTRACT

A terminal and a data transmission method in an Internet of vehicles are provided. According to embodiments of the present disclosure, a terminal determines at least one first carrier carrying first service data, and further sends to a network device a data volume of the first service data carried on the at least one first carrier, so that the network device can allocate a first transmission resource to the at least one first carrier according to the data volume of the first service data carried on the at least one first carrier.

17 Claims, 4 Drawing Sheets

---

Determine, by A a terminal determines, at least one first carrier carrying first service data — 101

↓

Send, by The the terminal sends to a network device, a data volume of the first service data carried on the at least one first carrier — 102

(56) References Cited

U.S. PATENT DOCUMENTS

| | | | |
|---|---|---|---|
| 2017/0086028 | A1 | 3/2017 | Hwang et al. |
| 2017/0230996 | A1 | 8/2017 | Li et al. |
| 2018/0176747 | A1* | 6/2018 | Li .................... H04W 74/0816 |
| 2018/0279275 | A1* | 9/2018 | Chen .................... H04W 76/14 |
| 2020/0169986 | A1* | 5/2020 | Lee .................... H04W 72/0493 |
| 2020/0367093 | A1* | 11/2020 | Belleschi .......... H04W 72/0413 |
| 2020/0374744 | A1* | 11/2020 | Liu ........................ H04W 76/11 |

FOREIGN PATENT DOCUMENTS

| | | |
|---|---|---|
| CN | 104918281 A | 9/2015 |
| CN | 106375456 A | 2/2017 |
| CN | 106507486 A | 3/2017 |
| CN | 106572506 A | 4/2017 |
| CN | 106792626 A | 5/2017 |
| CN | 107040997 A | 8/2017 |
| CN | 107124770 A | 9/2017 |
| CN | 107623563 A | 1/2018 |
| WO | 2016159715 A2 | 10/2016 |
| WO | 2017/053199 A1 | 3/2017 |

OTHER PUBLICATIONS

The Second Chinese Office Action dated Apr. 10, 2020; Appln. No. 201880003240.3.
LG Electronics; "Potential enhancements for PCS-based V2V", LG. 3GPP TSG RAN WG1 Meeting #82, Beijing China, Aug. 24-28, 2015; R1-154290, 4 pages.
The Extended European Search Report for EP patent application No. 18863793.8, dated Oct. 8, 2019.
ZTE: "Discussion on sidelink resource request mechanism in PC5 CA", 3GPP Draft; R2-1713072, 3rd Generation Partnership Project (3GPP), vol. RAN WG2, No. Reno, USA; Nov. 27, 2017-Dec. 1, 2017 Nov. 17, 2017(Nov. 17, 2017), XP051371900.
ZTE: "Discussion on carrier selection in PC5 CA", 3GPP Draft; R2-1713070, 3rd Generation Partnership Project (3GPP), vol. RAN WG2. No. Reno, USA; Nov. 27, 2017-Dec. 1, 2017 Nov. 17, 2017(Nov. 17, 2017), XP051371898.
Ericsson: "Sidelink Carrier Selection Criteria", 3GPP Draft; R2-1711493-Sidelink Carrier Selection Critreia, 3rd Generation Partnership Project (3GPP), vol. RAN WG2, No. Prague, Czech Republic: Oct. 9, 2017-Oct. 13, 2017 Oct. 8, 2017(Oct. 18, 2017), XP051343465.
The third office action of corresponding CN patent application No. 201880003240.3, dated Jun. 5, 2020.
The Communication pursuant to Article 94(3) EPC of corresponding EP patent application No. 18863793.8, dated Jul. 9, 2020.

* cited by examiner

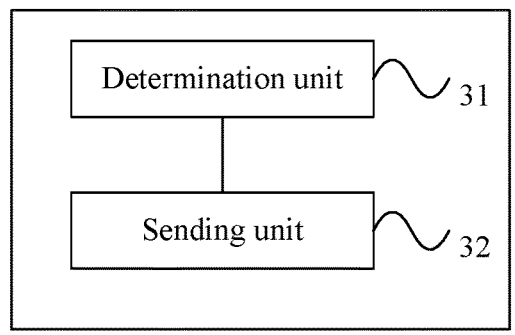
Fig. 2
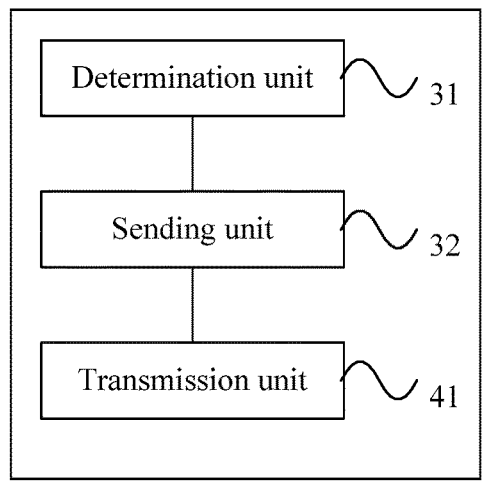
Fig. 3
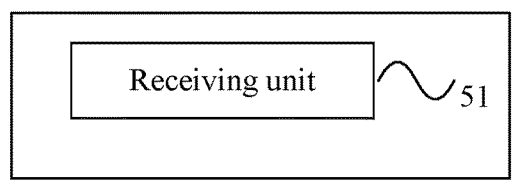
Fig. 4
Fig. 5

TERMINAL AND DATA TRANSMISSION TO PERFORM TERMINAL TO TERMINAL DATA TRANSMISSION IN AN INTERNET OF VEHICLES (IOV) SYSTEM

TECHNICAL FIELD

The present disclosure relates to a technology of Internet of vehicles (IoV), and more particularly to a terminal and a data transmission method in an Internet of vehicles.

BACKGROUND

An IoV system uses a direct communication mode between terminals and has a higher spectral efficiency and a lower transmission delay. In the IoV system, two types of terminals are generally involved, one is a Vehicle User Equipment (VUE), and the other is a Pedestrian User Equipment (PUE).

In the IoV system, the communication between terminals may be based on various wireless communication systems, such as a Long Term Evolution (LTE) system. In wireless communication systems, a multi-carrier technology has been used as a method of expanding system bandwidth. In a multi-carrier mode, multiple carriers may serve one terminal, and each carrier is also called a component carrier.

However, the related art does not teach how to perform terminal-to-terminal data transmission on multiple carriers in an IoV system.

SUMMARY

Some embodiments of the present disclosure provide a terminal and a data transmission method in an Internet of vehicles, which may perform terminal-to-terminal data transmission in an IoV system.

According to an embodiment of the present disclosure, a data transmission method in an Internet of vehicles is provided, which may include the operations as follows.

A terminal determines at least one first carrier carrying first service data.

The terminal sends to a network device a data volume of the first service data carried on the at least one first carrier.

According to another embodiment of the present disclosure, another data transmission method in an Internet of vehicles is provided, which may include the operations as follows.

A network device receives a data volume, sent by a terminal, of first service data carried on at least one first carrier for carrying the first service data.

According to another embodiment of the present disclosure, a terminal is provided, which may include:

a determination unit, configured to determine at least one first carrier carrying first service data; and a sending unit, configured to send to a network device a data volume of the first service data carried on the at least one first carrier.

According to another embodiment of the present disclosure, a network device is provided, which may include:

a receiving unit, configured to receive a data volume, sent by a terminal, of first service data carried on at least one first carrier for carrying the first service data.

According to embodiments of the present disclosure, a terminal determines at least one first carrier carrying first service data, and further sends to a network device a data volume of the first service data carried on the at least one first carrier, so that the network device can allocate a first transmission resource to the at least one first carrier according to the data volume of the first service data carried on the at least one first carrier, thereby implementing terminal-to-terminal data transmission in an IoV system.

According to the embodiments of the present disclosure, a network device receives a data volume, sent by a terminal, of first service data carried on at least one first carrier for carrying the first service data, so that the network device can allocate a first transmission resource to the at least one first carrier according to the data volume of the first service data carried on the at least one first carrier, thereby implementing terminal-to-terminal data transmission in an IoV system.

BRIEF DESCRIPTION OF THE DRAWINGS

In order to more clearly illustrate the technical solutions in the embodiments of the present disclosure, the drawings used in the description of the embodiments or the related art will be briefly described below. It is apparent that the drawings in the following description are some embodiments of the present disclosure, and other drawings can be obtained from those skilled in the art according to these drawings without any creative work.

FIG. 2 is a schematic flowchart of another data transmission method in an Internet of vehicles according to another embodiment of the present disclosure;

FIG. 3 is a schematic structure diagram of a terminal according to another embodiment of the present disclosure;

FIG. 4 is a schematic structure diagram of another terminal according to another embodiment of the present disclosure;

FIG. 5 is a schematic structure diagram of a network device according to another embodiment of the present disclosure;

DETAILED DESCRIPTION OF THE EMBODIMENTS

In order to make the purposes, technical solutions and advantages of the embodiments of the present disclosure clearer, the technical solutions in the embodiments of the present disclosure will be clearly and completely described hereinbelow with the drawings in the embodiments of the present disclosure. It is apparent that the described embodiments are part of the embodiments of the present disclosure, not all of the embodiments. On the basis of the embodiments of the present disclosure, all other embodiments obtained on the premise of no creative work of those of ordinary skill in the art fall within the scope of protection of the present disclosure.

In the IoV system, the communication between terminals may be based on various wireless communication systems, such as an LTE system. It is a Sidelink (SL) transmission technology, which is different from a conventional way of receiving or sending data through a network device in a wireless communication system. An IoV system uses a terminal-to-terminal direct communication mode and thus has a higher spectral efficiency and a lower transmission delay.

In addition, the term "and/or" herein is merely an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

Figure 1:
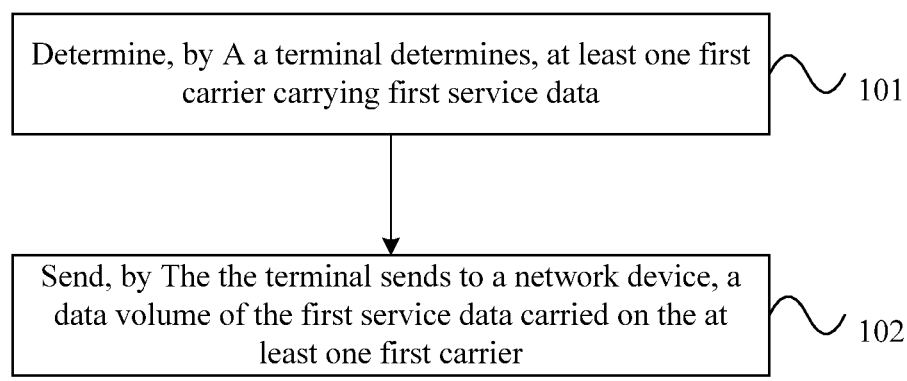
FIG. 1 is a schematic flowchart of a data transmission method in an Internet of vehicles according to an embodiment of the present disclosure.

FIG. 1 is a schematic flowchart of a data transmission method in an Internet of vehicles according to an embodiment of the present disclosure. As shown in FIG. 1, the data transmission method in the Internet of vehicles may include operations shown in blocks 101 and 102.

In block 101, a terminal determines at least one first carrier carrying first service data.

The first service data is data from the terminal in an Internet of vehicles to a receiving terminal.

In block 102, the terminal sends to a network device a data volume of the first service data carried on the at least one first carrier.

By implementing the above operations, data transmission between terminals in an IoV system can be realized.

In the embodiments of the present disclosure, the terminal involved may be a VUE, or may be a PUE having a listening capability, which is not particularly limited in the present embodiment.

In the embodiments of the present disclosure, the network device involved may be a network element such as an Evolved NodeB (eNB) in an LTE system, which is not particularly limited in the present embodiment.

It is to be noted that the PUE involved in the embodiments of the present disclosure may include, but is not limited to, a mobile phone, a Personal Digital Assistant (PDA), a wireless handheld device, a tablet computer, a Personal Computer (PC), an MP3 player, an MP4 player, a wearable device (for example, smart glasses, a smart watch or a smart bracelet), etc. The VUE involved in the embodiments of the present disclosure may also be referred to as a vehicle machine, which is an abbreviation of an in-vehicle infotainment product installed in a vehicle. The function of the vehicle machine is to realize a person-to-vehicle or vehicle-to-surrounding (vehicle-to-vehicle) information communication.

In a possible implementation manner of the present embodiment, in the operation shown in block 102, the data volume, sent by the terminal to the network device, of the first service data carried on the at least one first carrier may be a data volume of the first service data carried on each first carrier in the at least one first carrier.

For example, in a case where the terminal in the operation shown in block 101 determines two first carriers, the first carrier 1 carries a data volume A of the first service data, and the first carrier 2 does not carry the data volume of the first service data, then the data volume, sent by the terminal to the network device, of the first service data carried on the at least one first carrier may be the data volume A of the first service data carried on the first carrier 1 and a data volume 0 of the first service data carried on the first carrier 2.

In a possible implementation manner of the present embodiment, in the operation shown in block 102, the data volume, sent by the terminal to the network device, of the first service data carried on the at least one first carrier may be a data volume of the first service data carried on a first carrier which truly carries the first service data in the at least one first carrier.

For example, in a case where the terminal in the operation shown in block 101 determines two first carriers, the first carrier 1 carries a data volume A of the first service data, and the first carrier 2 does not carry the data volume of the first service data, then the data volume, sent by the terminal to the network device, of the first service data carried on the at least one first carrier may be the data volume A of the first service data carried on the first carrier 1. At this time, the terminal does not additionally send the data volume 0 of the first service data carried on the first carrier 2.

In a possible implementation manner of the present embodiment, in the operation shown in block 101, the terminal may determine the carrier quantity of first carriers carrying the first service data.

In at least one exemplary embodiment, the terminal may determine whether the first service data needs to be repeatedly transmitted.

In a case where the first service data does not need to be repeatedly transmitted, the terminal may determine that a carrier quantity of the at least one first carrier carrying the first service data is equal to or greater than 1.

At this time, a sum of data volumes sent by the terminal to the network device is equal to a data volume of the first service data.

For example, in a case where the data volume of the first service data is A, the terminal determines that the first service data does not need to be repeatedly transmitted. The terminal determines two first carriers, the first carrier 1 carries a data volume A1 of the first service data, the first carrier 2 carries a data volume A2 of the first service data, and the sum A1+A2 of data volumes sent by the terminal to the network device is equal to the data volume A of the first service data.

In a case where the first service data needs to be repeatedly transmitted, the terminal may determine that a carrier quantity of the at least one first carrier carrying the first service data is equal to or greater than 2.

At this time, a sum of data volumes sent by the terminal to the network device may be a multiple of a data volume of the first service data, such as double.

For example, in a case where the data volume of the first service data is A, the terminal determines that the first service data needs to be repeatedly transmitted. The terminal determines two first carriers, the first carrier 1 carries a data volume A1 of the first service data, the first carrier 2 carries a data volume A2 of the first service data, and the sum A1+A2 of data volumes sent by the terminal to the network device is equal to a data volume 2A of the first service data.

Generally, the first service data may be repeatedly transmitted by using a data replication function of a transmission entity such as a Packet Data Convergence Protocol (PDCP) entity. The replicated repeated data such as a repeated PDCP-layer Protocol Data Unit (PDU) is transmitted to a next-layer transmission entity such as a Radio Link Control (RLC) entity respectively. One RLC entity may correspond to one logical channel.

In at least one exemplary embodiment, the terminal may determine, according to configuration information, whether the first service data needs to be repeatedly transmitted. In a case where the first service data satisfies the configuration information, the terminal may determine that the first service data needs to be transmitted. The configuration information may include, but is not limited to, at least one of a specified service, a specified target address, a specified data priority, a specified logical channel and a specified logical channel group, which is not limited in the present embodiment.

As a possible implementation, the terminal may acquire the configuration information from the network device. In at least one exemplary embodiment, the terminal may receive configuration information sent by the network device by using high layer signaling or a system broadcast message.

For example, the high layer signaling may be a Radio Resource Control (RRC) message. As an exemplary implementation, the configuration information may be carried by an Information Element (IE) in the RRC message, and the RRC message may be an RRC message in the related art, for example, an RRC CONNECTION RECONFIGURATION message, which is not limited in the present embodiment. The IE of the existing RRC message is extended to carry the configuration information, or the RRC message may also be different from the RRC messages already available in the related art. Or, for example, the high layer signaling may be a Media Access Control (MAC) Control Element (CE) message. As an exemplary implementation, the configuration information may be carried by adding a new MAC CE message.

Or, for example, the configuration information may be carried by using an existing Master Information Block (MIB) or a System Information Block (SIB) in the system broadcast message, or a new SIB may be added to carry the configuration information.

As another possible implementation, the terminal may acquire the configuration information according to pre-configurations.

For example, the terminal may acquire the configuration information from a user card of the terminal.

In at least one exemplary embodiment, the user card of the terminal may include, but is not limited to, a User Identity Module (UIM) card, a Universal Subscriber Identity Module (USIM) card, a Subscriber Identity Module (SIM) card, or a Personal Identity Module (PIM) card, which is not limited in the present embodiment.

Or, for example, the terminal may acquire the configuration information from own device information of the terminal.

It is to be noted that, in the implementation process, when acquiring the configuration information, the terminal may preferentially acquire it from the network device, in a case where the configuration information is obtained from the network device, the terminal does not need to acquire it according to the pre-configurations; and in a case where the configuration information is not obtained from the network device, the terminal may acquire the configuration according to the pre-configurations.

In a possible implementation manner of the present embodiment, in the operation shown in block 101, the terminal may determine a mapping relationship between data priorities and first carriers, so that the terminal may determine the at least one first carrier carrying the first service data according to a data priority of the first service data.

In a specific implementation process, the terminal may acquire the mapping relationship between the data priorities and the first carriers from the network device. In at least one exemplary embodiment, the terminal may receive the mapping relationship between data priorities and first carriers sent by the network device by using high layer signaling or a system broadcast message.

For example, the high layer signaling may be an RRC message. As an exemplary implementation, the mapping relationship between data priorities and first carriers may be carried by an IE in the RRC message, and the RRC message may be an RRC message in the related art, for example, an RRC CONNECTION RECONFIGURATION message, which is not limited in the present embodiment. The IE of the existing RRC message is extended to carry the mapping relationship between data priorities and first carriers, or the RRC message may also be different from the RRC messages already available in the related art. Or, for example, the high layer signaling may be a MAC CE message. As an exemplary implementation, the mapping relationship between data priorities and first carriers may be carried by adding a new MAC CE message.

Or, for example, the mapping relationship between data priorities and first carriers may be carried by using an existing MIB or SIB in the system broadcast message, or a new SIB may be added to carry the mapping relationship between data priorities and first carriers.

In another specific implementation process, the terminal may acquire the mapping relationship between the data priorities and the first carriers according to pre-configurations.

For example, the terminal may acquire the mapping relationship between data priorities and first carriers from a user card of the terminal.

In at least one exemplary embodiment, the user card of the terminal may include, but is not limited to, a UIM card, a USIM card, a SIM card, or a PIM card, which is not limited in the present embodiment.

Or, for example, the terminal may acquire the mapping relationship between data priorities and first carriers from own device information of the terminal.

It is to be noted that, in the implementation process, when acquiring the mapping relationship between data priorities and first carriers, the terminal may preferentially acquire it from the network device, in a case where the mapping relationship between data priorities and first carriers is obtained from the network device, the terminal does not need to acquire it according to the pre-configurations; and in a case where the mapping relationship between data priorities and first carriers is not obtained from the network device, the terminal may acquire the configuration according to the pre-configurations.

In a possible implementation manner of the present embodiment, in the operation shown in block 101, the terminal may determine a mapping relationship between first logical channels and first carriers, so that the terminal may determine the at least one first carrier carrying the first service data according to a first logical channel of the first service data.

In a specific implementation process, the terminal may acquire the mapping relationship between the first logical channels and the first carriers from the network device. In at least one exemplary embodiment, the terminal may receive the mapping relationship between first logical channels and first carriers sent by the network device by using high layer signaling or a system broadcast message.

For example, the high layer signaling may be an RRC message. As an exemplary implementation, the mapping relationship between first logical channels and first carriers may be carried by an IE in the RRC message, and the RRC message may be an RRC message in the related art, for example, an RRC CONNECTION RECONFIGURATION message, which is not limited in the present embodiment. The IE of the existing RRC message is extended to carry the mapping relationship between first logical channels and first carriers, or the RRC message may also be different from the RRC messages already available in the related art. Or, for example, the high layer signaling may be a MAC CE message. As an exemplary implementation, the mapping relationship between first logical channels and first carriers may be carried by adding a new MAC CE message.

Or, for example, the mapping relationship between first logical channels and first carriers may be carried by using an existing MIB or SIB in the system broadcast message, or a new SIB may be added to carry the mapping relationship between first logical channels and first carriers.

In another specific implementation process, the terminal may acquire the mapping relationship between the first logical channels and the first carriers according to pre-configurations.

For example, the terminal may acquire the mapping relationship between first logical channels and first carriers from a user card of the terminal.

In at least one exemplary embodiment, the user card of the terminal may include, but is not limited to, a UIM card, a USIM card, a SIM card, or a PIM card, which is not limited in the present embodiment.

Or, for example, the terminal may acquire the mapping relationship between first logical channels and first carriers from own device information of the terminal.

It is to be noted that, in the implementation process, when acquiring the mapping relationship between first logical channels and first carriers, the terminal may preferentially acquire it from the network device, in a case where the mapping relationship between first logical channels and first carriers is obtained from the network device, the terminal does not need to acquire it according to the pre-configurations; and in a case where the mapping relationship between first logical channels and first carriers is not obtained from the network device, the terminal may acquire the configuration according to the pre-configurations.

In a possible implementation manner of the present embodiment, in the operation shown in block 101, the terminal may determine a mapping relationship between services and first carriers, so that the terminal may determine the at least one first carrier carrying the first service data according to a service of the first service data.

In a specific implementation process, the terminal may acquire the mapping relationship between the services and the first carriers from the network device. In at least one exemplary embodiment, the terminal may receive the mapping relationship between services and first carriers sent by the network device by using high layer signaling or a system broadcast message.

For example, the high layer signaling may be an RRC message. As an exemplary implementation, the mapping relationship between services and first carriers may be carried by an IE in the RRC message, and the RRC message may be an RRC message in the related art, for example, an RRC CONNECTION RECONFIGURATION message, which is not limited in the present embodiment. The IE of the existing RRC message is extended to carry the mapping relationship between services and first carriers, or the RRC message may also be different from the RRC messages already available in the related art. Or, for example, the high layer signaling may be a MAC CE message. As an exemplary implementation, the mapping relationship between services and first carriers may be carried by adding a new MAC CE message.

Or, for example, the mapping relationship between services and first carriers may be carried by using an existing MIB or SIB in the system broadcast message, or a new SIB may be added to carry the mapping relationship between services and first carriers.

In another specific implementation process, the terminal may acquire the mapping relationship between the services and the first carriers according to pre-configurations.

For example, the terminal may acquire the mapping relationship between services and first carriers from a user card of the terminal.

In at least one exemplary embodiment, the user card of the terminal may include, but is not limited to, a UIM card, a USIM card, a SIM card, or a PIM card, which is not limited in the present embodiment.

Or, for example, the terminal may acquire the mapping relationship between services and first carriers from own device information of the terminal.

It is to be noted that, in the implementation process, when acquiring the mapping relationship between services and first carriers, the terminal may preferentially acquire it from the network device, in a case where the mapping relationship between services and first carriers is obtained from the network device, the terminal does not need to acquire it according to the pre-configurations; and in a case where the mapping relationship between services and first carriers is not obtained from the network device, the terminal may acquire the configuration according to the pre-configurations.

In a possible implementation manner of the present embodiment, in the operation shown in block 101, the terminal may determine a mapping relationship between target addresses and first carriers, so that the terminal may determine the at least one first carrier carrying the first service data according to a target address of the first service data.

In a specific implementation process, the terminal may acquire the mapping relationship between the target addresses and the first carriers from the network device. In at least one exemplary embodiment, the terminal may receive the mapping relationship between target addresses and first carriers sent by the network device by using high layer signaling or a system broadcast message.

For example, the high layer signaling may be an RRC message. As an exemplary implementation, the mapping relationship between target addresses and first carriers may be carried by an IE in the RRC message, and the RRC message may be an RRC message in the related art, for example, an RRC CONNECTION RECONFIGURATION message, which is not limited in the present embodiment. The IE of the existing RRC message is extended to carry the mapping relationship between target addresses and first carriers, or the RRC message may also be different from the RRC messages already available in the related art. Or, for example, the high layer signaling may be a MAC CE message. As an exemplary implementation, the mapping relationship between target addresses and first carriers may be carried by adding a new MAC CE message.

Or, for example, the mapping relationship between target addresses and first carriers may be carried by using an existing MIB or SIB in the system broadcast message, or a new SIB may be added to carry the mapping relationship between target addresses and first carriers.

In another specific implementation process, the terminal may acquire the mapping relationship between the target addresses and the first carriers according to pre-configurations.

For example, the terminal may acquire the mapping relationship between target addresses and first carriers from a user card of the terminal.

In at least one exemplary embodiment, the user card of the terminal may include, but is not limited to, a UIM card, a USIM card, a SIM card, or a PIM card, which is not limited in the present embodiment.

Or, for example, the terminal may acquire the mapping relationship between target addresses and first carriers from own device information of the terminal.

It is to be noted that, in the implementation process, when acquiring the mapping relationship between target addresses and first carriers, the terminal may preferentially acquire it from the network device, in a case where the mapping relationship between target addresses and first carriers is obtained from the network device, the terminal does not need to acquire it according to the pre-configurations; and in a case where the mapping relationship between target addresses and first carriers is not obtained from the network device, the terminal may acquire the configuration according to the pre-configurations.

In a possible implementation manner of the present embodiment, after the operation shown in block 102, the terminal may further transmit the first service data on the at least one first carrier by using a first transmission resource allocated to the at least one first carrier by the network device.

In this implementation manner, the network device may allocate a first transmission resource to the at least one first carrier according to the data volume of the first service data carried on the at least one first carrier. Thus, the terminal may transmit the first service data on the first carrier by using the first transmission resource.

In the present embodiment, a terminal determines at least one first carrier carrying first service data, and further sends to a network device a data volume of the first service data carried on the at least one first carrier, so that the network device can allocate a first transmission resource to the at least one first carrier according to the data volume of the first service data carried on the at least one first carrier, thereby implementing terminal-to-terminal data transmission in an IoV system.

FIG. 2 is a schematic flowchart of another data transmission method in an Internet of vehicles according to another embodiment of the present disclosure. As shown in FIG. 2, the data transmission method in the Internet of vehicles may include operations shown in block 201.

In block 201, a network device receives a data volume, sent by a terminal, of first service data carried on at least one first carrier for carrying the first service data.

The first service data is data from the terminal in an Internet of vehicles to a receiving terminal.

In the embodiments of the present disclosure, the terminal involved may be a VUE, or may be a PUE having a listening capability, which is not particularly limited in the present embodiment.

In the embodiments of the present disclosure, the network device involved may be a network element such as an eNB in an LTE system, which is not particularly limited in the present embodiment.

It is to be noted that the PUE involved in the embodiments of the present disclosure may include, but is not limited to, a mobile phone, a PDA, a wireless handheld device, a tablet computer, a PC, an MP3 player, an MP4 player, a wearable device (for example, smart glasses, a smart watch or a smart bracelet), etc. The VUE involved in the embodiments of the present disclosure may also be referred to as a vehicle machine, which is an abbreviation of an in-vehicle infotainment product installed in a vehicle. The function of the vehicle machine is to realize a person-to-vehicle or vehicle-to-surrounding (vehicle-to-vehicle) information communication.

In a possible implementation manner of the present embodiment, in the operation shown in block 201, the data volume, received by the network device and sent by the terminal, of the first service data carried on the at least one first carrier may be a data volume of the first service data carried on each first carrier in the at least one first carrier.

For example, in a case where the terminal determines two first carriers, the first carrier 1 carries a data volume A of the first service data, and the first carrier 2 does not carry the data volume of the first service data, then the data volume, sent by the terminal to the network device, of the first service data carried on the at least one first carrier may be the data volume A of the first service data carried on the first carrier 1 and a data volume 0 of the first service data carried on the first carrier 2.

In a possible implementation manner of the present embodiment, in the operation shown in block 201, the data volume, received by the network device and sent by the terminal, of the first service data carried on the at least one first carrier may be a data volume of the first service data carried on a first carrier which truly carries the first service data in the at least one first carrier.

For example, in a case where the terminal determines two first carriers, the first carrier 1 carries a data volume A of the first service data, and the first carrier 2 does not carry the data volume of the first service data, then the data volume, sent by the terminal to the network device, of the first service data carried on the at least one first carrier may be the data volume A of the first service data carried on the first carrier 1. At this time, the terminal does not additionally send the data volume 0 of the first service data carried on the first carrier 2.

In a possible implementation manner of the present embodiment, before the operation shown in block 201, the network device may further send a mapping relationship between data priorities and first carriers to the terminal, so that the terminal determines the at least one first carrier carrying the first service data according to a data priority of the first service data.

Thus, the terminal may determine a mapping relationship between data priorities and first carriers, so that the terminal may determine the at least one first carrier carrying the first service data according to a data priority of the first service data.

In a possible implementation manner of the present embodiment, before the operation shown in block 201, the network device may further send a mapping relationship between first logical channels and first carriers to the terminal, so that the terminal determines the at least one first carrier carrying the first service data according to a first logical channel of the first service data.

Thus, the terminal may determine a mapping relationship between first logical channels and first carriers, so that the terminal may determine the at least one first carrier carrying the first service data according to a first logical channel of the first service data.

In a possible implementation manner of the present embodiment, before the operation shown in block 201, the network device may further send a mapping relationship between services and first carriers to the terminal, so that the terminal determines the at least one first carrier carrying the first service data according to a service of the first service data.

Thus, the terminal may determine a mapping relationship between services and first carriers, so that the terminal may determine the at least one first carrier carrying the first service data according to a service of the first service data.

In a possible implementation manner of the present embodiment, before the operation shown in block 201, the network device may further send a mapping relationship between target addresses and first carriers to the terminal, so that the terminal determines the at least one first carrier carrying the first service data according to a target address of the first service data.

Thus, the terminal may determine a mapping relationship between target addresses and first carriers, so that the terminal may determine the at least one first carrier carrying the first service data according to a target address of the first service data.

In a possible implementation manner of the present embodiment, after the operation shown in block 201, the network device may further allocate a first transmission resource to the at least one first carrier according to the data volume of the first service data carried on the at least one first carrier, so that the terminal transmits the first service data on the at least one first carrier by using the first transmission resource.

In the present embodiment, a network device receives a data volume, sent by a terminal, of first service data carried on at least one first carrier for carrying the first service data, so that the network device can allocate a first transmission resource to the at least one first carrier according to the data volume of the first service data carried on the at least one first carrier, thereby implementing terminal-to-terminal data transmission in an IoV system.

It is to be noted that, for the foregoing method embodiments, for the sake of brevity, they are all described as a series of action combinations, but those skilled in the art should understand that the present disclosure is not limited by the described action sequence, because certain operations may be performed in other sequences or concurrently in accordance with the present disclosure. Secondly, those skilled in the art should also understand that the embodiments described in the specification are all preferred embodiments, and the actions and modules involved are not necessarily required by the present disclosure.

In the above embodiment, descriptions of each embodiment are emphasized respectively, and parts which are not elaborated in detail in a certain embodiment may refer to relevant descriptions of other embodiments.

FIG. 3 is a schematic structure diagram of a terminal according to another embodiment of the present disclosure. As shown in FIG. 3, the terminal of the present embodiment may include a determination unit 31 and a sending unit 32. The determination unit 31 is configured to determine at least one first carrier carrying first service data. The sending unit 32 is configured to send to a network device a data volume of the first service data carried on the at least one first carrier.

The first service data is data from the terminal in an Internet of vehicles to a receiving terminal.

In the embodiments of the present disclosure, the terminal involved may be a VUE, or may be a PUE having a listening capability, which is not particularly limited in the present embodiment.

In the embodiments of the present disclosure, the network device involved may be a network element such as an eNB in an LTE system, which is not particularly limited in the present embodiment.

In a possible implementation manner of the present embodiment, the determination unit 31 may be configured to determine the carrier quantity of first carriers carrying the first service data.

In at least one exemplary embodiment, the determination unit 31 may be configured to: determine whether the first service data needs to be repeatedly transmitted; determine, in a case where the first service data does not need to be repeatedly transmitted, that a carrier quantity of the at least one first carrier carrying the first service data is equal to or greater than 1; and determine, in a case where the first service data needs to be repeatedly transmitted, that a carrier quantity of the at least one first carrier carrying the first service data is equal to or greater than 2.

In a case where the first service data needs to be repeatedly transmitted, a sum of data volumes sent by the sending unit 32 to the network device is a multiple of a data volume of the first service data, such as double.

In a case where the first service data does not need to be repeatedly transmitted, a sum of data volumes sent by the sending unit 32 to the network device is equal to a data volume of the first service data.

Generally, the first service data may be repeatedly transmitted by using a data replication function of a transmission entity such as a PDCP entity. The replicated repeated data such as a repeated PDCP-layer PDU is transmitted to a next-layer transmission entity such as an RLC entity respectively. One RLC entity may correspond to one logical channel.

In at least one exemplary embodiment, the determination unit 31 may be configured to determine, according to configuration information, whether the first service data needs to be repeatedly transmitted. In a case where the first service data satisfies the configuration information, the determination unit 31 may determine that the first service data needs to be transmitted. The configuration information may include, but is not limited to, at least one of a specified service, a specified target address, a specified data priority, a specified logical channel and a specified logical channel group, which is not limited in the present embodiment.

As a possible implementation, the determination unit 31 may acquire the configuration information from the network device. In at least one exemplary embodiment, the determination unit 31 may receive configuration information sent by the network device by using high layer signaling or a system broadcast message.

For example, the high layer signaling may be an RRC message. As an exemplary implementation, the configuration information may be carried by an IE in the RRC message, and the RRC message may be an RRC message in the related art, for example, an RRC CONNECTION RECONFIGURATION message, which is not limited in the present embodiment. The IE of the existing RRC message is extended to carry the configuration information, or the RRC message may also be different from the RRC messages already available in the related art, Or, for example, the high layer signaling may be a MAC CE message. As an exemplary implementation, the configuration information may be carried by adding a new MAC CE message.

Or, for example, the configuration information may be carried by using an existing MIB or SIB in the system broadcast message, or a new SIB may be added to carry the configuration information.

As another possible implementation, the determination unit 31 may acquire the configuration information from a user card of the terminal.

In at least one exemplary embodiment, the user card of the terminal may include, but is not limited to, a UIM card, a USIM card, a SIM card, or a PIM card, which is not limited in the present embodiment.

As another possible implementation, the determination unit 31 may acquire the configuration information from own device information of the terminal.

It is to be noted that, in the implementation process, when acquiring the configuration information, the determination unit 31 may preferentially acquire it from the network device, in a case where the configuration information is obtained from the network device, the determination unit 31 does not need to acquire it according to the pre-configurations; and in a case where the configuration information is not obtained from the network device, the determination unit 31 may acquire the configuration according to the pre-configurations.

In a possible implementation manner of the present embodiment, the determination unit 31 may be configured to determine a mapping relationship between data priorities and first carriers, and determine the at least one first carrier carrying the first service data according to a data priority of the first service data.

In at least one exemplary embodiment, the determination unit 31 may be configured to: acquire the mapping relationship between the data priorities and the first carriers from the network device; or, acquire the mapping relationship between the data priorities and the first carriers according to pre-configurations.

It is to be noted that, in the implementation process, when acquiring the mapping relationship between data priorities and first carriers, the determination unit 31 may preferentially acquire it from the network device, in a case where the mapping relationship between data priorities and first carriers is obtained from the network device, the determination unit 31 does not need to acquire it according to the pre-configurations; and in a case where the mapping relationship between data priorities and first carriers is not obtained from the network device, the determination unit 31 may acquire the configuration according to the pre-configurations.

In a possible implementation manner of the present embodiment, the determination unit 31 may be configured to determine a mapping relationship between first logical channels and first carriers, and determine the at least one first carrier carrying the first service data according to a first logical channel of the first service data.

In at least one exemplary embodiment, the determination unit 31 is configured to: acquire the mapping relationship between the first logical channels and the first carriers from the network device; or, acquire the mapping relationship between the first logical channels and the first carriers according to pre-configurations.

It is to be noted that, in the implementation process, when acquiring the mapping relationship between first logical channels and first carriers, the determination unit 31 may preferentially acquire it from the network device, in a case where the mapping relationship between first logical channels and first carriers is obtained from the network device, the determination unit 31 does not need to acquire it according to the pre-configurations; and in a case where the mapping relationship between first logical channels and first carriers is not obtained from the network device, the determination unit 31 may acquire the configuration according to the pre-configurations.

In a possible implementation manner of the present embodiment, the determination unit 31 may be configured to determine a mapping relationship between services and first carriers, and determine the at least one first carrier carrying the first service data according to a service of the first service data.

In at least one exemplary embodiment, the determination unit 31 may be configured to: acquire the mapping relationship between the services and the first carriers from the network device; or, acquire the mapping relationship between the services and the first carriers according to pre-configurations.

It is to be noted that, in the implementation process, when acquiring the mapping relationship between services and first carriers, the determination unit 31 may preferentially acquire it from the network device, in a case where the mapping relationship between services and first carriers is obtained from the network device, the determination unit 31 does not need to acquire it according to the pre-configurations; and in a case where the mapping relationship between services and first carriers is not obtained from the network device, the determination unit 31 may acquire the configuration according to the pre-configurations.

In a possible implementation manner of the present embodiment, the determination unit 31 may be configured to determine a mapping relationship between target addresses and first carriers, and determine the at least one first carrier carrying the first service data according to a target address of the first service data.

In at least one exemplary embodiment, the determination unit 31 may be configured to: acquire the mapping relationship between the target addresses and the first carriers from the network device; or, acquire the mapping relationship between the target addresses and the first carriers according to pre-configurations.

It is to be noted that, in the implementation process, when acquiring the mapping relationship between target addresses and first carriers, the determination unit 31 may preferentially acquire it from the network device, in a case where the mapping relationship between target addresses and first carriers is obtained from the network device, the determination unit 31 does not need to acquire it according to the pre-configurations; and in a case where the mapping relationship between target addresses and first carriers is not obtained from the network device, the determination unit 31 may acquire the configuration according to the pre-configurations.

In a possible implementation manner of the present embodiment, as shown in FIG. 4, the terminal provided by the present embodiment may further include a transmission unit 41, which may be configured to transmit the first service data on the at least one first carrier by using a first transmission resource allocated to the at least one first carrier by the network device.

It is to be noted that the method in the embodiment corresponding to FIG. 1 may be implemented by the terminal provided in the present embodiment. For details, refer to related content in the embodiment corresponding to FIG. 1, and details are not described herein again.

In the present embodiment, a determination unit determines at least one first carrier carrying first service data, and a sending unit further sends to a network device a data volume of the first service data carried on the at least one first carrier, so that the network device can allocate a first transmission resource to the at least one first carrier according to the data volume of the first service data carried on the at least one first carrier, thereby implementing terminal-to-terminal data transmission in an IoV system.

FIG. 5 is a schematic structure diagram of a network device according to another embodiment of the present disclosure. As shown in FIG. 5, the network device of the present embodiment may include a receiving unit 51, configured to receive a data volume, sent by a terminal, of first service data carried on at least one first carrier for carrying the first service data.

The first service data is data from the terminal in an Internet of vehicles to a receiving terminal.

In the embodiments of the present disclosure, the terminal involved may be a VUE, or may be a PUE having a listening capability, which is not particularly limited in the present embodiment.

In the embodiments of the present disclosure, the network device involved may be a network element such as an eNB in an LTE system, which is not particularly limited in the present embodiment.

Figure 6:
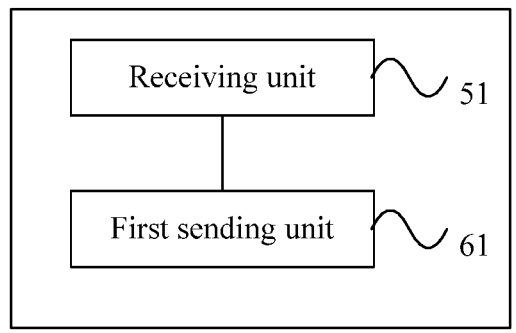
FIG. 6 is a schematic structure diagram of another network device according to another embodiment of the present disclosure.

In a possible implementation manner of the present embodiment, as shown in FIG. 6, the network device provided by the present embodiment may further include a first sending unit 61, which may be configured to send a mapping relationship between data priorities and first carriers to the terminal, so that the terminal determines the at least one first carrier carrying the first service data according to a data priority of the first service data.

Figure 7:
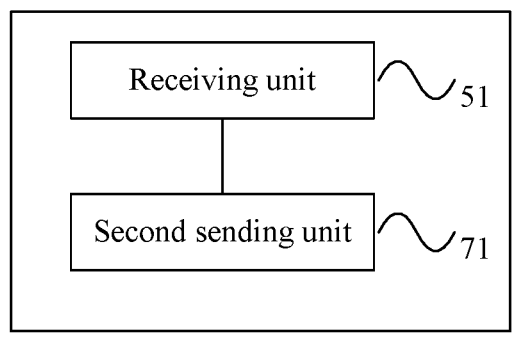
FIG. 7 is a schematic structure diagram of another network device according to another embodiment of the present disclosure.

In a possible implementation manner of the present embodiment, as shown in FIG. 7, the network device provided by the present embodiment may further include a second sending unit 71, which may be configured to send a mapping relationship between first logical channels and first carriers to the terminal, so that the terminal determines the at least one first carrier carrying the first service data according to a first logical channel of the first service data.

Figure 8:
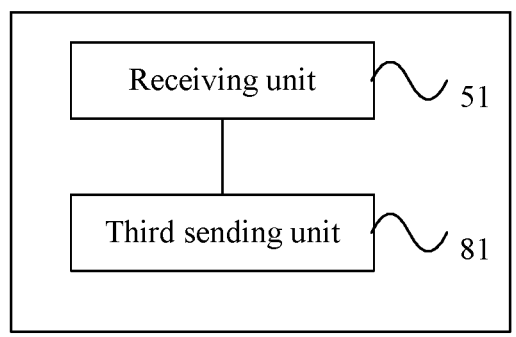
FIG. 8 is a schematic structure diagram of another network device according to another embodiment of the present disclosure.

In a possible implementation manner of the present embodiment, as shown in FIG. 8, the network device provided by the present embodiment may further include a third sending unit 81, which may be configured to send a mapping relationship between services and first carriers to the terminal, so that the terminal determines the at least one first carrier carrying the first service data according to a service of the first service data.

Figure 9:
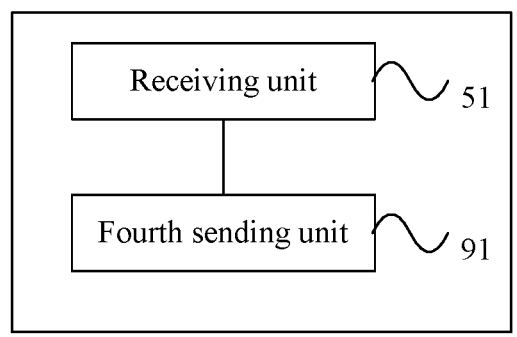
FIG. 9 is a schematic structure diagram of another network device according to another embodiment of the present disclosure.

In a possible implementation manner of the present embodiment, as shown in FIG. 9, the network device provided by the present embodiment may further include a fourth sending unit 91, which may be configured to send a mapping relationship between target addresses and first carriers to the terminal, so that the terminal determines the at least one first carrier carrying the first service data according to a target address of the first service data.

Figure 10:
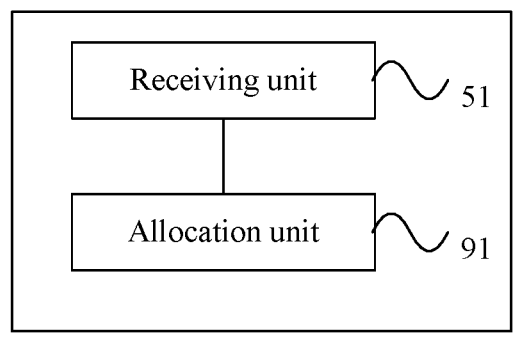
FIG. 10 is a schematic structure diagram of another network device according to another embodiment of the present disclosure.

In a possible implementation manner of the present embodiment, as shown in FIG. 10, the network device provided by the present embodiment may further include an allocation unit 1001, which may be configured to allocate a first transmission resource to the at least one first carrier according to the data volume of the first service data carried on the at least one first carrier, so that the terminal transmits the first service data on the at least one first carrier by using the first transmission resource.

It is to be noted that the method in the embodiment corresponding to FIG. 2 may be implemented by the network device provided in the present embodiment. For details, refer to related content in the embodiment corresponding to FIG. 2, and details are not described herein again.

In the present embodiment, a receiving unit receives a data volume, sent by a terminal, of first service data carried on at least one first carrier for carrying the first service data, so that the network device can allocate a first transmission resource to the at least one first carrier according to the data volume of the first service data carried on the at least one first carrier, thereby implementing terminal-to-terminal data transmission in an IoV system.

Those skilled in the art can clearly understand that for the convenience and brevity of the description, the specific working process of the system, apparatus and unit described above may refer to the corresponding process in the foregoing method embodiment, and details are not described herein again.

In several embodiments provided by the present disclosure, it is to be understood that the disclosed system, apparatus and method may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed may be indirect coupling or communication connection between apparatuses or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be integrated into one processing unit, or each unit may exist physically separately, or two or more units may be integrated into one unit. The integrated unit may be implemented in the form of hardware or implemented in the form of hardware plus a software function unit.

It is to be noted that the foregoing embodiments are only used to illustrate the technical solutions of the present disclosure, and are not limited thereto; although the present disclosure has been described in detail with reference to the foregoing embodiments, those skilled in the art should understand that the technical solutions described in the foregoing embodiments may be still modified, or some technical features are equivalently replaced. The modifications or replacements do not make the essence of the corresponding technical solution depart from the spirit and scope of the technical solutions of various embodiments of the present disclosure.

What is claimed is:

1. A data transmission method in an Internet of vehicles, the method comprising:
   determining, by a terminal, at least one first carrier carrying first service data; and
   sending, by the terminal to a network device, a data volume of the first service data carried on the at least one first carrier;
   wherein determining by the terminal, the at least one first carrier carrying the first service data comprises:
   determining, by the terminal, whether the first service data needs to be repeatedly transmitted;

in a case where the first service data needs to be repeatedly transmitted, determining, by the terminal, that a carrier quantity of the at least one first carrier carrying the first service data is equal to or greater than 2;

in a case where the first service data does not need to be repeatedly transmitted, determining, by the terminal, that a carrier quantity of the at least one first carrier carrying the first service data is equal to or greater than 1.

2. The method as claimed in claim 1, wherein determining, by the terminal, the at least one first carrier carrying the first service data comprises:

determining, by the terminal, a mapping relationship between data priorities and first carriers; and determining, by the terminal, the at least one first carrier carrying the first service data according to a data priority of the first service data;

or, determining, by the terminal, a mapping relationship between first logical channels and first carriers; and determining, by the terminal, the at least one first carrier carrying the first service data according to a first logical channel of the first service data;

or, determining, by the terminal, a mapping relationship between services and first carriers; and determining, by the terminal, the at least one first carrier carrying the first service data according to a service of the first service data;

or, determining, by the terminal, a mapping relationship between target addresses and first carriers; and determining, by the terminal, the at least one first carrier carrying the first service data according to a target address of the first service data.

3. The method as claimed in claim 2, wherein determining, by the terminal, the mapping relationship comprises:

acquiring, by the terminal, the mapping relationship from the network device; or, acquiring, by the terminal, the mapping relationship according to pre-configurations.

4. The method as claimed in claim 1, wherein after sending, by the terminal to the network device, the data volume of the first service data carried on the at least one first carrier, the method further comprises:

transmitting, by the terminal, the first service data on the at least one first carrier by using a first transmission resource allocated to the at least one first carrier by the network device.

5. A terminal, comprising:

a determination unit, configured to determine at least one first carrier carrying first service data; and a sending unit, configured to send to a network device a data volume of the first service data carried on the at least one first carrier;

wherein the determination unit is configured to: determine whether the first service, data needs to be repeatedly transmitted; and determine, in case where the first service data needs to be repeatedly transmitted, that a carrier quantity of the at least one first carrier carrying the first service data is equal to or greater than 2;

the determination unit is further configured to: determine, in a case where the first service data does not need to be repeatedly transmitted that a carrier quantity of the at least one first carrier carrying the first service data is equal to or greater than 1.

6. The terminal as claimed in claim 5, wherein the determination unit is configured to:

determine a mapping relationship between data priorities and first carriers; and determine the at least one first carrier carrying the first service data according to a data priority of the first service data.

7. The terminal as claimed in claim 6, wherein the determination unit is configured to:

acquire the mapping relationship between the data priorities and the first carriers from the network device; or, acquire the mapping relationship between the data priorities and the first carriers according to pre-configurations.

8. The terminal as claimed in claim 5, wherein the determination unit is configured to:

determine a mapping relationship between first logical channels and first carriers; and determine the at least one first carrier carrying the first service data according to a first logical channel of the first service data.

9. The terminal as claimed in claim 8, wherein the determination unit is configured to:

acquire the mapping relationship between the first logical channels and the first carriers from the network device; or, acquire the mapping relationship between the first logical channels and the first carriers according to pre-configurations.

10. The terminal as claimed in claim 5, wherein the determination unit is configured to:

determine a mapping relationship between services and first carriers; and determine the at least one first carrier carrying the first service data according to a service of the first service data.

11. The terminal as claimed in claim 10, wherein the determination unit is configured to:

acquire the mapping relationship between the services and the first carriers from the network device; or, acquire the mapping relationship between the services and the first carriers according to pre-configurations.

12. The terminal as claimed in claim 5, wherein the determination unit is configured to:

determine a mapping relationship between target addresses and first carriers; and determine the at least one first carrier carrying the first service data according to a target address of the first service data.

13. The terminal as claimed in claim 12, wherein the determination unit is configured to:

acquire the mapping relationship between the target addresses and the first carriers from the network device; or, acquire the mapping relationship between the target addresses and the first carriers according to pre-configurations.

14. The terminal as claimed in claim 5, wherein a sum of data volumes sent by the sending unit to the network device is a multiple of a data volume of the first service data.

15. The terminal as claimed in claim 5, wherein a sum of data volumes sent by the sending unit to the network device is equal to a data volume of the first service data.

16. The terminal as claimed in claim 5, further comprising a transmission unit, configured to:

transmit the first service data on the at least one first carrier by using a first transmission resource allocated to the at least one first carrier by the network device.

17. A network device, comprising:

a receiving unit, configured to receive a data volume, sent by a terminal, of first service data carried on at least one first carrier for carrying the first service data;

wherein in a case where the first service data needs to be repeatedly transmitted, a carrier quantity of the at least one first carrier carrying the first service data is equal to or greater than 2; and in a case where the first service data does not need to be repeatedly transmitted, a carrier quantity of the at least one first carrier carrying the first service data is equal to or greater than 1.

\* \* \* \* \*

UNITED STATES PATENT AND TRADEMARK OFFICE
CERTIFICATE OF CORRECTION

PATENT NO. : 10,972,883 B2  
APPLICATION NO. : 16/340304  
DATED : April 6, 2021  
INVENTOR(S) : Jianhua Liu Page 1 of 1

It is certified that error appears in the above-identified patent and that said Letters Patent is hereby corrected as shown below:

On the Title Page

Item (73) Assignee:  
GUANDONG OPPO MOBILE TELECOMMUNICATIONS CORP., LTD., Dongguan (CN)

Is changed to:  
GUANGDONG OPPO MOBILE TELECOMMUNICATIONS CORP., LTD., Dongguang, Guangdong (CN)

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*